United States Patent
Blue et al.

(10) Patent No.: US 9,878,788 B2
(45) Date of Patent: Jan. 30, 2018

(54) AIRCRAFT

(71) Applicant: ADVISR AERO LLC, San Diego, CA (US)

(72) Inventors: Linden S. Blue, Del Mar, CA (US); Austin J. N. Blue, Encinitas, CA (US)

(73) Assignee: ADVISR AERO LLC, San Diego, CA (US)

( * ) Notice: Subject to any disclaimer, the term of this patent is extended or adjusted under 35 U.S.C. 154(b) by 424 days.

(21) Appl. No.: 14/795,406

(22) Filed: Jul. 9, 2015

(65) Prior Publication Data

US 2017/0008622 A1   Jan. 12, 2017

(51) Int. Cl.
| | |
|---|---|
| *B64C 27/16* | (2006.01) |
| *B64C 27/18* | (2006.01) |
| *B64C 27/24* | (2006.01) |
| *B64C 3/38* | (2006.01) |
| *B64C 37/00* | (2006.01) |
| *B64C 39/10* | (2006.01) |
| *B64C 29/00* | (2006.01) |

(52) U.S. Cl.
CPC .............. *B64C 39/10* (2013.01); *B64C 3/38* (2013.01); *B64C 27/16* (2013.01); *B64C 27/18* (2013.01); *B64C 27/24* (2013.01); *B64C 29/0075* (2013.01); *B64C 37/00* (2013.01); *B64C 2039/105* (2013.01)

(58) Field of Classification Search
CPC ... B64C 39/10; B64C 2039/105; B64C 37/00; B64C 27/16; B64C 27/18; B64C 27/24; B64C 27/22; B64C 3/38; B64C 29/0075
See application file for complete search history.

(56) References Cited

U.S. PATENT DOCUMENTS

| | | | | |
|---|---|---|---|---|
| 2,479,125 | A * | 8/1949 | Leonard | B64C 29/0075 244/102 R |
| 2,866,608 | A * | 12/1958 | Leonard | B64C 29/0075 244/7 B |
| 5,238,204 | A | 8/1993 | Metz | |
| 5,516,060 | A * | 5/1996 | McDonnell | B64C 29/02 244/207 |
| 5,918,832 | A | 7/1999 | Zerweckh | |
| 6,880,478 | B2 | 4/2005 | Schmitz, Sr. et al. | |
| 8,070,090 | B2 * | 12/2011 | Tayman | B64C 27/24 244/6 |
| 8,157,203 | B2 * | 4/2012 | Kinsey | B64C 29/02 244/17.23 |
| 8,991,751 | B2 * | 3/2015 | Page | B64C 29/02 244/39 |

(Continued)

FOREIGN PATENT DOCUMENTS

WO   WO 2016109408 A1 *   7/2016   ............. B64C 27/24

*Primary Examiner* — Richard R Green
(74) *Attorney, Agent, or Firm* — Nydegger & Associates

(57) ABSTRACT

An aircraft is provided that is convertible in flight between a rotary wing configuration and a fixed wing configuration. In its fixed wing configuration the aircraft resembles a Blended Wing Body (BWB) having a swept wing angle β. Conversions from the fixed wing configuration to the rotary wing configuration, and vice versa, are accomplished by flipping an outboard portion of one wing through 180° to reorient the leading edge of the outboard portion by an angle of 2β to establish a reverse sweep. In its rotary configuration, the entire aircraft is rotated.

6 Claims, 2 Drawing Sheets

(56) References Cited

U.S. PATENT DOCUMENTS

| | | | |
|---|---|---|---|
| 9,688,398 B2* | 6/2017 | Page | B64C 29/02 |
| 2005/0011427 A1 | 1/2005 | Schmitz, Sr. et al. | |
| 2010/0003904 A1 | 1/2010 | Duescher | |
| 2015/0028155 A1* | 1/2015 | Reiter | B64C 27/16 |
| | | | 244/39 |
| 2015/0251749 A1* | 9/2015 | Sherman | B64C 3/385 |
| | | | 244/99.11 |

* cited by examiner

AIRCRAFT

FIELD OF THE INVENTION

The present invention pertains generally to aerodynamic configurations and propulsion units for aircraft. In particular, the present invention pertains to aircraft that fly in either a rotary wing configuration or a fixed wing configuration. The present invention is particularly, but not exclusively, useful as an aircraft that can be converted in flight between its rotary wing and fixed wing configurations, and wherein for the rotary wing configuration the entire aircraft is rotated.

BACKGROUND OF THE INVENTION

While both rotary wing and fixed wing aircraft have been commonplace for quite some time, and although the underlying aerodynamics for each type aircraft can be separately appreciated, different combinations of the two are not so well known. Various aircraft designs which can fly both vertically and horizontally have generally fallen under the rubric of Vertical Takeoff and Landing (VTOL) aircraft. Helicopters are the most common configuration of this type and tilt rotor and tilt wing designs change the aerodynamic configuration so that the aircraft can fly both vertically and horizontally. In general, VTOL aircraft have been characterized by changes in or implementation of their respective aircraft lifting components (i.e. their airfoil and/or propulsion unit). In all cases, however, the entire fuselage of the aircraft has been directed along a linear flight path. This requirement has always been a design constraint.

In accordance with basic aerodynamic considerations, both rotary wing flight and fixed wing flight require an interaction between an airfoil and the air. Their differences stem from the fact that for fixed wing flight the airfoil is pulled or pushed through the air, along with its fuselage, in the direction of flight. On the other hand, for rotary wing flight the airfoil is rotated through the air independently of the fuselage and its direction of flight. As inferred above, we are now seeing aircraft which employ in-flight structural conversions designed to selectively benefit from the aerodynamic capabilities of either rotary wing or fixed wing flight. Heretofore, however, the fuselage has never been intentionally rotated along with its airfoil(s).

With the above in mind, a combined consideration of several basic mechanical and aerodynamic principles is important. First, all airfoils are essentially similar, and when moving through air will create a lifting force L, which can be mathematically expressed in a Lift Equation as:

$$L = \tfrac{1}{2} \rho S v^2 C_{L\alpha} \alpha$$

where $\rho$ is air density, S is the wing area of the airfoil, v is the airfoil velocity, $\alpha$ is the angle of attack of the airfoil, and $C_{L\alpha}$ is the coefficient of Lift (as a function of $\alpha$).

From the Lift Equation it is to be noted that for normal flight conditions only the velocity of the airfoil v, and the angle of attack of the airfoil $\alpha$, are significantly controllable. Further it is to be appreciated that the airfoil will stall (i.e. L=0) when $\alpha$ becomes too great or v becomes too small. This is particularly important when the same airfoil will be required to provide Lift L for both rotary wing and fixed wing flight.

Another important dynamic consideration for any aircraft is its linear momentum as it moves along a linear flight path. Mathematically, linear momentum is expressed as MV, wherein M is the mass of the entire aircraft, and V is the linear velocity of the entire aircraft. Importantly, linear momentum for an aircraft will be the same, regardless of whether the aircraft is being flown in a rotary wing configuration R, or a fixed wing configuration F. The importance in both cases is that in the expression for momentum, V is a vector. Accordingly, the velocity vector V has both a magnitude (i.e. speed) and a direction. As noted above, an aircraft will have a linear momentum MV anytime it is moving along a linear path.

As is well known, the basic in-flight forces acting on an aircraft are Lift (L), Weight (W), Thrust (T) and Drag (D). Moreover, for straight and level, unaccelerated flight, L=W and T=D. With these forces in mind, another distinction between rotary wing and fixed wing flight is that for fixed wing flight, L is provided by the airfoils and T is provided by a separate mechanism (e.g. propeller, jet, or thruster). On the other hand, for rotary wing flight, L and T are both provided by the airfoil.

It is axiomatic that controls for flying an aircraft in rotary wing flight will be different than the controls used for fixed wing flight. In brief overview, first consider fixed wing flight maneuvers where the roll, pitch and yaw movements of an aircraft are more discernable. For fixed wing flight, roll is controlled by ailerons located on outboard portions of each wing. Pitch is controlled by an elevator located on the horizontal stabilizer of the aircraft's empennage, and yaw is controlled by a rudder which is located on the vertical stabilizer of the empennage. On the other hand, for rotary wing flight, aircraft maneuvers are made by controlling the thrust vector that is generated by the rotating blades.

Rotary wing flight is made possible by the combined control of collective and cyclic variation in the angle of attack $\alpha$ of the rotating blades. In essence, collective control provides for a same uniform increase or decrease in the angle of attack $\alpha$ on all rotating blades (wings). Thus, lift is provided for the aircraft. Unlike collective controls, cyclic control results from individual cyclical changes in the angle of attack $\alpha$ of each rotating blade during each rotation of the blade. The consequence here is that the lift vector provided by the rotating blades does more than simply provide lift. With cyclic control, the lift vector is also effectively tilted to provide a thrust component for the aircraft in the desired direction of flight.

In light of the above, it is an object of the present invention to provide an aircraft that is convertible in flight between a rotary wing configuration R and a fixed wing configuration F. Another object of the present invention is to provide an aircraft where the entire aircraft is rotated when the aircraft is in R for rotary wing flight. Still another object of the present invention is to provide a convertible aircraft which uses aileron control for pitch and roll aircraft maneuvers in its fixed wing configuration F and aileron control for both collective and cyclic control in its rotary wing configuration R.

SUMMARY OF THE INVENTION

An aircraft in accordance with the present invention is capable of flying either as a conventional fixed wing aircraft using conventional fixed wing control techniques or, alternatively, as a rotating body, which employs aerodynamic control techniques that are similar to those now used for rotary wing aircraft. Preferably, the aircraft is shaped as a Blended Wing Body (BWB). In any event, as a rotating body, the entire aircraft (BWB) is rotated. It is also an important aspect of the present invention that the aircraft can be converted, in flight, from a rotary wing configuration R into a fixed wing configuration F and vice versa. As envisioned for the aircraft, in F the wing span of the aircraft will preferably be in a range of 5 ft. to 150 ft.

Structurally, an aircraft of the present invention includes a base member which defines a symmetrical plane. A pair of outboard wing portions extending from the base member on opposite sides of the symmetrical plane and each outboard wing portion has a leading edge which is oriented at an angle β relative to the symmetrical plane. Thus, the aircraft will resemble a Blended Wing Body (BWB) when it is in its fixed wing configuration F. Preferably, β is in a range between 0° and 60°.

An actuator is mounted on the base member at a distance d from the symmetrical plane for flipping an outboard wing portion of the aircraft about a reconfiguration axis that is perpendicular to the symmetrical plane. With this flipping of the outboard wing portion, which is preferably located at a distance greater than d from the symmetrical plane, the aircraft is converted from its fixed wing configuration F into its rotary wing configuration R, or vice versa. In the event, the outboard wing portion is flipped 180° to change an orientation of its leading edge by an angle of 2β.

A pair of thrusters is mounted on the aircraft. They are located on opposite sides of the symmetrical plane at a distance s from the symmetrical plane. With this combination, it is to be appreciated that during the flipping action mentioned above, only one outboard portion is flipped. The opposite wing section that is not flipped may have its angle of attack changed by rotating the section of the wing, or by using combinations of flaps and ailerons which are both extended and reflexed. Preferably, the thrusters are embedded into the BWB of the aircraft. Further, the thruster that is associated with the flipped outboard portion is also flipped. Note: the distance s for each thruster from the plane of symmetry may be different.

With the aircraft in F, both thrusters generate propulsion forces on the aircraft in the same direction. When the aircraft is in R, however, the thrusters generate forces on the aircraft that act in opposite directions. The result for R is that a force couple is generated on the aircraft. Consequently, the thrusters propel the entire aircraft along a flight path in fixed wing flight when the aircraft is in F. And they rotate the entire aircraft for rotary wing flight when the aircraft is in R. As envisioned for the present invention, the thrusters can be propellers, jets or rockets.

A controller which is mounted on the base member, and connected to the actuator, is used for flipping the outboard wing portion to convert the aircraft between F and R. The controller is also connected to the pair of thrusters for controlling forces exerted by respective thrusters on the base member of the aircraft. Also, for the flipping action, it is preferable that s>d.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
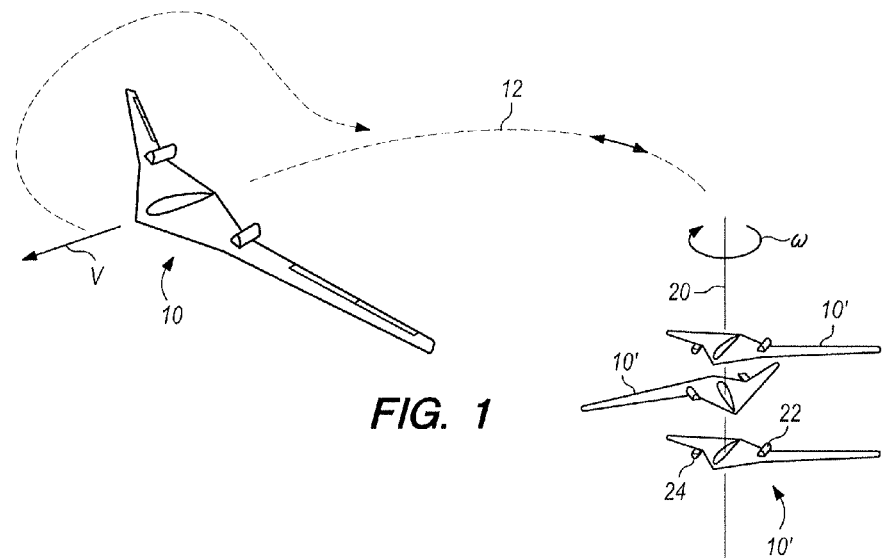
FIG. 1 is a schematic presentation of a typical flight envelope for an aircraft of the present invention.

Referring initially to FIG. 1 an aircraft in accordance with the present invention is shown, and depending on its configuration is generally designated 10 or 10'. More particularly, the aircraft 10 is shown flying on a typical flight path 12 that requires both rotary wing and fixed wing flight capabilities. As shown in FIG. 1, and for disclosure purposes only, the aircraft when designated 10 will be generally considered as being in a fixed wing configuration (this configuration is hereinafter sometimes referred to as "F"). On the other hand, when designated 10' it will be generally considered that the aircraft 10' is in the rotary wing configuration (this configuration is hereinafter sometimes referred to as "R"). As also indicated in FIG. 1, rotary wing flight for the aircraft 10' will require the entire aircraft 10' to be rotated, in R, at an angular velocity, ω. For F, however, ω=0. In either configuration, aircraft 10' (R), as well as aircraft 10 (F), will both have a flight velocity vector V that is indicative of forward flight along the flight path 12. With this in mind, unless rotary wing flight is being specifically considered, reference may sometimes be made to only aircraft 10.

Figure 2:
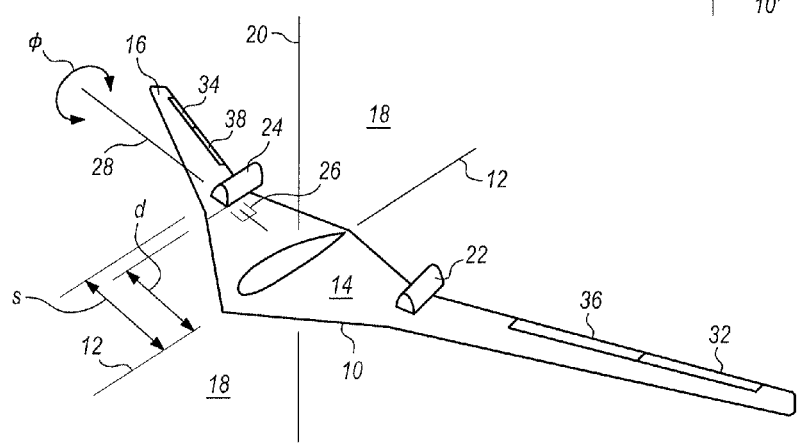
FIG. 2 is a perspective view of an aircraft in accordance with the present invention in a fixed wing configuration F.

In FIG. 2, the aircraft 10 is presented in F (i.e. fixed wing configuration) and it is shown to essentially resemble a Blended Wing Body (BWB). As such, the aircraft 10 has a base member 14, with an outboard wing portion 16 attached thereto. It is to be appreciated that in F, the aircraft 10 effectively defines a symmetrical plane 18. In general, the symmetrical plane 18 is defined by the forward flight path 12 of an in-flight aircraft 10, and a rotation axis 20 about which the aircraft 10' will rotate at the angular velocity ω when the aircraft 10' is in R (i.e. rotary wing configuration). Thus, the symmetrical plane 18 is used for the purpose of structurally defining the aircraft 10 and its variants, F and R.

Still referring to FIG. 2 it will be seen that the aircraft 10 includes a left thruster 22 and a right thruster 24. Both of which will be generally positioned at a distance s from the symmetrical plane 18, but on opposite sides of the symmetrical plane 18. Although both the left thruster 22 and the right thruster 24 are shown externally above the BWB of aircraft 10, it will be appreciated that the thrusters 22 and 24 may be embedded within the BWB of the aircraft 10.

FIG. 2 also shows that an actuator 26 is mounted on the aircraft 10 at a distance d from the symmetrical plane 18. Preferably, the actuator 26 is mounted internally within the BWB of the aircraft 10. In any event, the functional purpose of the actuator 26 is to flip the outboard wing portion 16, together with the right thruster 24, around a reconfiguration axis 28 through an angle of approximately 180°. As the outboard wing portion 16 is being flipped, there may also be an actuator on the opposite wing to change its angle of attack. As shown, the reconfiguration axis 28 is perpendicular to the symmetrical plane 18. The consequence of this is to reconfigure the aircraft 10 from F to R. This reconfiguration will be best appreciated with reference to FIGS. 3A and 3B.

Figure 3A:
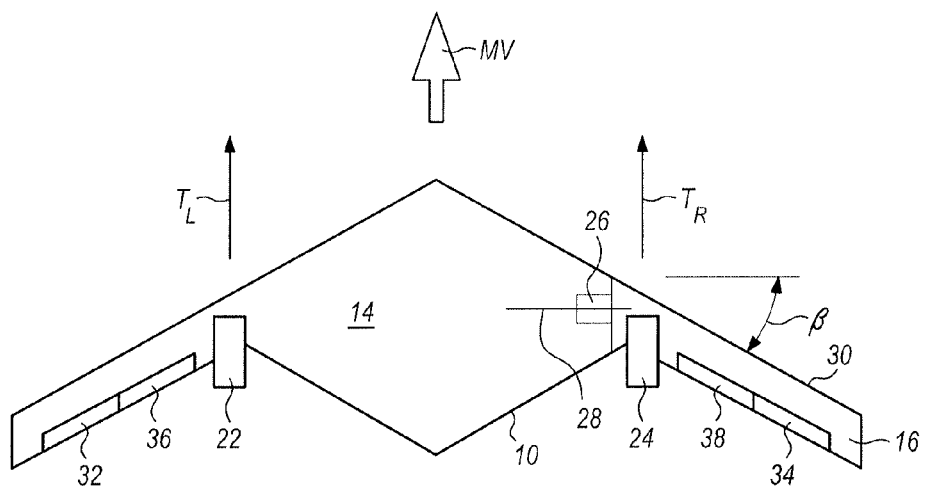
FIG. 3A is a top plan view of an aircraft of the present invention with the aircraft in its fixed wing configuration F.
Figure 3B:
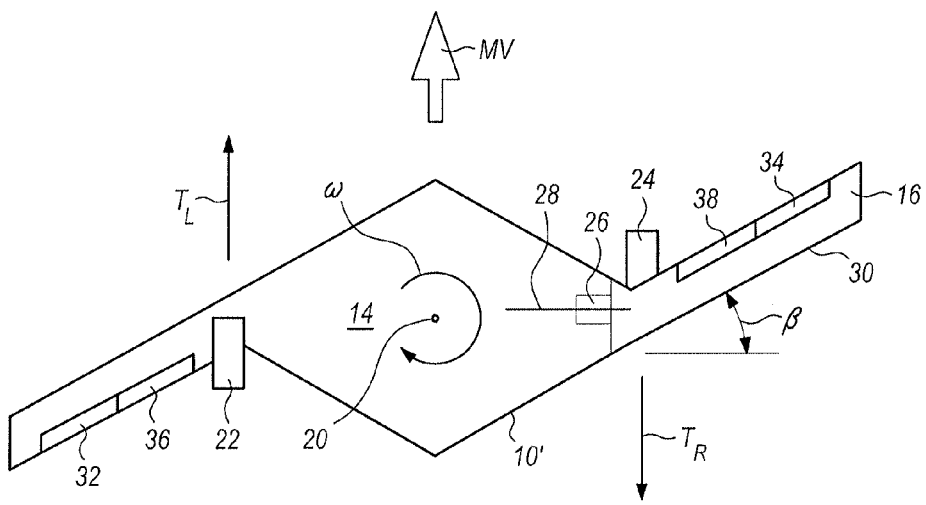
FIG. 3B is a top plan view of the aircraft shown in FIG. 3A, with the aircraft in its rotary wing configuration R.

In FIG. 3A, with aircraft 10 in F, it will be seen that the outboard wing portion 16 for the BWB of the aircraft 10 has a leading edge 30 that is inclined at an angle β relative to the reconfiguration axis 28. On the other hand, in FIG. 3B, after the outboard wing portion 16 has been flipped and the aircraft 10' is in R, the leading edge 30 in F becomes a trailing edge 30 in R. This relationship would indicate that the outboard wing portion 16 may be optimally designed as a symmetrical or semi-symmetrical airfoil. There is, however, another important consideration that results from the F to R conversion. The consideration here is that for F of aircraft 10, the thrust $T_L$ of left thruster 22, and the thrust $T_R$ of right thruster 24 are in the same direction. This orientation is provided to propel the aircraft 10 in F at a flight velocity V along the flight path 12. In R for aircraft 10', however, the thrust $T_L$ of left thruster 22, and the thrust $T_R$ of right thruster 24 are in opposite directions. The consequence here is that for aircraft 10' in R, $T_L$ and $T_R$ generate a force couple on the aircraft 10' that will cause it to rotate with an angular velocity ω about the rotation axis 20.

For control of the aircraft 10/10' in F and R, it is envisioned that the flight controls will include, in combination, a left aileron 32 and a right aileron 34. Additionally, the combination may also include a left flap 36 and a right flap 38. With consideration for the aircraft 10 in F, the aileron combination 32/34 can be conventionally controlled with opposed aileron movements for roll and yaw control, while also being used together in concert for pitch control. On the other hand, with the aircraft 10' in R, the ailerons of the combination 32/34 can be separately moved cyclically during each rotation of the aircraft 10' to aerodynamically tilt the L/T vector of the aircraft 10' for directional flight. If used, the flap combination 36/38 can be employed to emphasize and influence the actions of the aileron combination 32/34 described above. As another control feature, the flap combination 36/38 can also be used to help reduce ω during and R to F conversion.

As envisioned for the present invention, a typical flight envelope for the aircraft 10/10' will entail take offs and landings with the aircraft 10' in R. This, however, does not preclude take offs and landings with the aircraft 10 in F. In either case, long distance legs of a flight will most likely be performed in F. Further, it is envisioned that during a mission the aircraft 10' may periodically loiter at a selected location(s) in R. Consequently, conversions of the aircraft 10/10' from R to F, and F to R, will be necessary for any mission.

In general, R to F and F to R conversions will necessarily be accomplished at altitude, with the expectation of some control loss and some altitude loss during a conversion. Depending on the size of the aircraft 10/10', altitude loss can be minimized. Moreover, during a conversion, the momentum MV of the aircraft will have a stabilizing influence and will provide a reference for control transition between rotary wing and fixed wing flight. In each case, entry into a conversion should be made with minimum power on each of the thrusters 22, 24, and ω as well as V should be reduced to just above a stall condition. Once an F/R or R/F conversion has been completed, power on the thrusters 22, 24 can be applied as needed to restore flight control.

While the particular Aircraft as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An aircraft, wherein the aircraft is convertible in-flight between a rotary wing configuration R and a fixed wing configuration F, the aircraft comprising:
    a base member, wherein the base member defines a symmetrical plane;
    a pair of outboard wing portions extending from the base member on opposite sides of the symmetrical plane, wherein each outboard wing portion has a leading edge and the leading edge is oriented at an angle β relative to the symmetrical plane in the fixed wing configuration F;
    an actuator mounted on the base member at a distance d from the symmetrical plane for flipping an outboard wing portion of the aircraft about a reconfiguration axis perpendicular to the symmetrical plane to convert the aircraft from F to R and vice versa, wherein the outboard wing portion is at a distance greater than d from the symmetrical plane;
    a pair of thrusters mounted on the aircraft, wherein the thrusters are each mounted on the aircraft on opposite sides of the symmetrical plane at a distance s from the symmetrical plane, wherein s>d and wherein the thrusters propel the entire aircraft in fixed wing flight when the aircraft is in F, and rotates the entire aircraft for rotary wing flight when the aircraft is in R wherein the pair of thrusters include a first thruster mounted on the aircraft at a distance $s_1$ from the symmetrical plane, and a second thruster mounted on the aircraft at a distance $s_2$ from the symmetrical plane and wherein $s_1$ is not equal to $s_2$; and
    a controller mounted on the base member and connected to the actuator for converting the aircraft between F and R, and connected to each thruster for controlling forces exerted on the base member of the aircraft.

2. An aircraft as recited in claim 1 wherein a wing span for F of the aircraft is in a range of 5 ft. to 150 ft.

3. An aircraft as recited in claim 1 wherein the aircraft has a sweep angle β in F, and β is in a range between 0° and 60°.

4. An aircraft as recited in claim 1 wherein the outboard wing portion is flipped 180° to change an orientation of its leading edge by an angle of 2β.

5. An aircraft as recited in claim 1 wherein the thrusters are embedded in the aircraft.

6. An aircraft as recited in claim 1 further comprising ailerons on each outboard wing portion for remotely controlling the aircraft in rotary wing flight maneuvers with combined aileron movements for collective and cyclic controls when the aircraft is in R, and in fixed wing flight maneuvers with combined aileron movements for roll, yaw and pitch when the aircraft is in F.

* * * * *